(12) United States Patent
Jensen et al.

(10) Patent No.: US 10,328,640 B2
(45) Date of Patent: Jun. 25, 2019

(54) WIND TURBINE BLADE MANUFACTURING SYSTEM AND METHOD

(71) Applicant: LM WP Patent Holding A/S, Kolding (DK)

(72) Inventors: Rasmus Duegaard Jensen, Kolding (DK); Jacobus J Van Der Zee, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 252 days.

(21) Appl. No.: 15/305,221

(22) PCT Filed: Apr. 24, 2015

(86) PCT No.: PCT/EP2015/058931
§ 371 (c)(1),
(2) Date: Oct. 19, 2016

(87) PCT Pub. No.: WO2015/162257
PCT Pub. Date: Oct. 29, 2015

(65) Prior Publication Data
US 2017/0043542 A1 Feb. 16, 2017

(30) Foreign Application Priority Data
Apr. 24, 2014 (EP) .................................. 14165839

(51) Int. Cl.
*B29C 70/44* (2006.01)
*B29C 31/00* (2006.01)
(Continued)

(52) U.S. Cl.
CPC .......... *B29C 70/443* (2013.01); *B29C 31/00* (2013.01); *B29C 33/12* (2013.01); *B29C 66/721* (2013.01);
(Continued)

(58) Field of Classification Search
None
See application file for complete search history.

(56) References Cited

U.S. PATENT DOCUMENTS

| 3,713,753 | A | 1/1973 | Brunsch | |
|---|---|---|---|---|
| 2012/0213638 | A1* | 8/2012 | Frydendal | B29C 33/424 416/223 R |

FOREIGN PATENT DOCUMENTS

| CN | 1252754 A | 5/2000 |
|---|---|---|
| WO | 2013113813 A2 | 8/2013 |
| WO | 2013113817 A1 | 8/2013 |

OTHER PUBLICATIONS

Chinese office action dated May 3, 2018 for corresponding application No. 201580021342.4 with English summary attached.

* cited by examiner

*Primary Examiner* — Barbara J Musser
(74) *Attorney, Agent, or Firm* — Nath, Goldberg & Meyer; Jerald L. Meyer; Tanya E. Harkins

(57) ABSTRACT

There is described a system and apparatus for the manufacture of a wind turbine blade where portions of a blade, preferably blade half shells, are formed in suitable molds, before transferal to a post-molding station where post-molding operations can be performed. The blade shells are formed in the mold to have integrated flanges which facilitate easy handling of the blade shells during subsequent manufacturing operations. There is also described a blade cradle of a post-molding station to receive a wind turbine blade shell, where a lifting jack apparatus can be located within the blade cradle structure for the application of a lifting force to a surface of a blade shell received in the cradle, to facilitate access to all sections of the surface of the blade shell.

12 Claims, 6 Drawing Sheets

(51) Int. Cl.
  *B29D 99/00* (2010.01)
  *F03D 1/06* (2006.01)
  *B29C 33/12* (2006.01)
  *B29C 65/00* (2006.01)
  *B29L 31/08* (2006.01)

(52) U.S. Cl.
  CPC .......... *B29C 70/44* (2013.01); *B29D 99/0028* (2013.01); *F03D 1/0675* (2013.01); *B29L 2031/085* (2013.01); *F05B 2230/50* (2013.01); *F05B 2240/2211* (2013.01); *F05B 2240/30* (2013.01); *F05B 2280/6003* (2013.01); *Y02E 10/721* (2013.01); *Y02P 70/523* (2015.11)

WIND TURBINE BLADE MANUFACTURING SYSTEM AND METHOD

This is a National Phase Application filed under 35 U.S.C. 371 as a national stage of PCT/EP2015/058931, filed Apr. 24, 2015, an application claiming the benefit of European Application No. 14165839.3, filed Apr. 24, 2014, the content of each of which is hereby incorporated by reference in its entirety.

FIELD OF THE INVENTION

The present invention relates to a system and method for the manufacture of a wind turbine blade.

BACKGROUND OF THE INVENTION

A new wind turbine blade manufacturing method is described in International Patent Application Publication No. WO 2013/113813 A1. A blade half shell is formed through the layup of fibre material and curable resin in a relatively simple, preferably stationary, blade shell mould. The resin is cured to form the blade half shell, which is then transferred from the blade mould to a post-moulding station comprising an open-framed blade shell cradle. The blade half shells can be retained in the cradle through the use of vacuum suction cups located along the length of the blade cradle. Various different post-moulding operations can be performed on the blade shell in the cradle, e.g. adhesive application, grinding, painting, machining, etc. A pair of blade half shells can be closed at the post-moulding station to form a finished wind turbine blade, by the turning of a first blade cradle having a first half shell on top of a second blade cradle having a second half shell.

An advantage of such a system is that the occupancy time of the blade mould is reduced, as the cured blade shell is transferred to the post-moulding cradle for further processing, once the curing operation is complete. Consequently, the cycle time for production of sets of wind turbine blades can be reduced, with a more efficient use of resources, e.g. equipment, manufacturing teams, etc.

However, such a manufacturing system presents challenges with regard to the handling of the blade half shells and the finished blade. It is an object of the invention to provide a manufacturing system and method having improved handling systems compared to the prior art.

U.S. Pat. No. 3,713,753 discloses a method of manufacturing a helicopter blade. The method involves forming a hardened shell enclosing a spar. The hardened shell comprises two shell parts which are manufactured in mould such that an edge extends beyond the mould. The edges are trimmed off after the helicopter blade has hardened.

SUMMARY OF THE INVENTION

Accordingly, there is provided a method for manufacturing a wind turbine blade comprising the steps of:
  moulding at least one wind turbine blade shell in a blade mould; and
  transferring said blade shell to a blade cradle for post-moulding operations, including the joining of said at least one wind turbine blade shell with a second wind turbine blade shell to form at least a portion of a wind turbine blade,
  wherein said step of moulding comprises forming integrated flanges as part of said blade shell, and wherein said flanges are used for subsequent handling of said blade shell.

By providing flanges as part of the blade shell, the wind turbine blade component is formed with integrated handling elements, allowing for ease of movement and manipulation of the blade shell during manufacture. It will be understood that the wind turbine blade shell may comprise at least a portion of a half shell of a wind turbine blade. It will be understood that said flanges are removable from the wind turbine blade shell after the blade shell handling steps are substantially complete, e.g. after the step of transferring the blade shell to the blade cradle, and/or after the forming of the wind turbine blade by the joining of at least two blade shells.

In one aspect, said flanges comprise guide flanges, and wherein the step of transferring said blade shell to said blade cradle comprises aligning said guide flanges with corresponding markers provided on said blade cradle.

The use of integrated guide flanges on the blade shell provides for consistent and accurate alignment markers, which are easily reproducible during manufacture of a series of blade shells. Accordingly, it can be ensured that precise placement of a blade shell in a blade cradle will occur during manufacture, which can provide for accurate processing of the blade shell and/or closing of a pair of blade shells to form a wind turbine blade.

Preferably, said guide flanges comprise guide holes, wherein corresponding guide rods are provided on said blade cradle, and wherein said step of aligning comprises positioning said blade shell in said blade cradle such that said guide rods are received in said guide holes.

The blade cradle, which functions as a post-moulding station, may also be provided with a flange. The above mentioned guide rods may thus form part of a guide flange, which corresponds to the guide flange of the blade shell, e.g. via a mating guide connection. It is also possible to use the guiding flanges in a reverse configuration, i.e. with guide holes provided in the blade cradle and guide rods being arranged on the flanges of the blade shell.

Additionally or alternatively, guide rods may be provided on or formed integrally with said guide flanges, wherein said step of aligning comprises positioning said blade shell in said blade cradle such that said guide rods are received in corresponding guide holes provided on said blade cradle.

In an additional or alternative aspect, said flanges comprise bolting flanges having bolt apertures defined thereon, and wherein the method comprises the step of releasably securing said blade shell to said mould and/or to said blade cradle by bolting said bolting flanges to said mould and/or to said blade cradle.

As the flanges may be used as bolt flanges, the blade shells can be easily secured to the blade mould, and particularly the blade cradles, to prevent relative movement between the blade shells and the moulds/cradles. This provides particular advantages for a blade shell turning or closing operation, wherein a blade shell can be partially or fully retained in a first blade cradle as the cradle is closed over a second blade cradle to form a wind turbine blade.

Preferably, the method comprises the steps of:
  transferring a first blade shell to a first blade cradle;
  transferring a second blade shell to a second blade cradle; and
  closing first and second blade cradles to join said first and second blade shells to form at least a portion of a wind turbine blade.

In one aspect, said step of closing comprises aligning said first blade shell and said second blade shell, wherein at least one flange provided on said first blade shell is used to align with at least one flange provided on said second blade shell.

Additionally or alternatively, at least one flange provided on said first blade shell is used to align with at least one marker or guide rod provided on said second cradle.

The flanges can be used to provide for accurate alignment between blade shells for a closing operation. As the flanges are integrally formed with the blade shells from their formation in the blade moulds, accordingly the alignment can be ensured at a process level for continuous sets of blade shells.

It will be understood that said flanges may be provided with integrated guide rods for alignment between first and second blade shells. Additionally or alternatively, said first and second blade shells may be aligned using guide rods provided on at least one of said blade cradles.

Preferably, said step of closing comprises bonding said first blade shell to said second blade shell to form at least a portion of a wind turbine blade.

Preferably, the step of forming integrated flanges comprises:
forming a first array of flanges along a leading edge side of said blade shell; and
forming a second array of flanges along a trailing edge side of said blade shell.

By forming the flanges along the leading and trailing edges of the blade shells, accordingly any forces due to the lifting or handling of the blade shells can be easily distributed throughout the entire blade shell.

Preferably, the method further comprises the step of removing said flanges from said wind turbine blade shell after said step of transferring, preferably after said step of closing said first and second cradles.

The step of removing may be performed by cutting or machining the flanges from the blade shell or from the wind turbine blade.

Preferably, the step of moulding comprises:
providing a blade mould having a primary mould surface to define a surface of a wind turbine blade shell;
applying fibre material on said primary mould surface;
providing a resin; and
curing said resin in said fibre material to provide a blade shell.

The step of providing a resin may comprise infusing said fibre material with a resin. Alternatively, said fibre material may comprise a fibre material pre-impregnated with uncured resin.

Preferably, the method further comprises the steps of:
providing a blade mould having at least one flange moulding surface adjacent said mould surface;
applying flange fibre material on said at least one flange moulding surface; and
curing resin in said flange fibre material to form at least one flange integrated with said blade shell.

There is further provided a wind turbine blade manufacturing apparatus comprising:
a wind turbine blade mould for forming a blade shell; and
a blade cradle for receiving a blade shell formed in said mould,
wherein said blade mould is arranged to form a blade shell having at least one integrated flange used for subsequent handling of said blade shell. The blade cradle advantageously comprises markers, e.g. in form of guiding flanges, for aligning with said at least one integrated flange.

Preferably, said blade cradle comprises at least one guide rod for aligning said blade cradle with at least one integrated flange provided on a blade shell formed in said blade mould.

There is further provided a wind turbine blade shell having at least one integrated flange used for handling of said blade shell. The flange may advantageously further be adapted for aligning with corresponding markers or flanges of a blade cradle.

Preferably, said blade shell defines a portion of a wind turbine blade profile having a leading edge and a trailing edge, and wherein said at least one integrated flange is located along said leading edge and/or said trailing edge.

Additionally or alternatively, there is also provided a method of processing at least a portion of a wind turbine blade, the method comprising the steps of:
moulding a wind turbine blade shell in a blade mould;
transferring said blade shell to a post-moulding station, wherein said post-moulding station comprises an open-framed blade cradle to receive said blade shell; and
performing at least one post-moulding operation on said blade shell at said post-moulding station,
wherein the method further comprises applying a lifting or jacking force to a surface of a blade shell received in said cradle from beneath said blade shell to raise at least a portion of said blade shell above said cradle, to allow a post-moulding operation to be performed on a surface of said blade shell.

In order to allow for post-moulding operations on the under-surface of the blade shell in the blade cradle, a simple lifting jack can extend through the open-framed structure of the cradle to raise at least a portion of the blade shell above any impeding surfaces of the cradle. Such a system allows for easy access of portions of the wind turbine blade shell adjacent to the leading or trailing edges of the shell. Additionally or alternatively, the lifting force can be applied in order to raise an entire blade shell or finished blade at least partially clear and proud of portions of the cradle, for example for the ease of attachment of lifting apparatus, such as crane hoists, to the contained shell or blade.

Preferably, the method comprises providing a lifting device at said post-moulding station, said lifting device operable to apply a lifting force to a surface of a blade shell received in said cradle, wherein said lifting device is arranged beneath said open-framed cradle to raise at least a portion of said blade shell above said cradle.

In one aspect, the method comprises providing a plurality of lifting devices at said post-moulding station distributed along the longitudinal length of said post-moulding station, wherein the method comprises selectively applying a lifting force using said devices to different locations of a blade shell received in said cradle.

There is also provided a post-moulding station for use in the processing of at least a portion of a wind turbine blade, comprising:
a substantially open-framed cradle to receive a wind turbine blade shell, wherein post-moulding operations can be performed on a wind turbine blade shell received in said cradle; and
at least one lifting device, wherein said at least one lifting device is arranged beneath said open-framed cradle, said at least one lifting device operable to apply a lifting or jacking force to the underside of a blade shell received in said cradle to elevate at least a portion of said blade shell above said cradle, for access to at least a portion of a surface of said blade shell.

Preferably, said cradle comprises at least one vacuum device to apply a vacuum force to a surface of a blade shell received in said cradle. In one aspect, said at least one vacuum device is coupled with an actuator such that said at least one vacuum device is operable to apply a lifting force to a surface of a blade shell received in said cradle.

Preferably, said at least one lifting device comprises a support surface to bear against a surface of a blade shell received in said cradle, wherein said support surface can be arranged within said open-framed cradle.

Preferably, said at least one lifting device comprises a cushioned support surface. Preferably, said at least one lifting device is arranged toward a tip end of said cradle, to raise a tip end of a blade shell received in said cradle.

Preferably, the post-moulding station comprises an array of lifting devices arranged along the longitudinal length of said cradle, wherein said array of lifting devices are operable to selectively apply a lifting force to different locations of a blade shell received in said cradle.

Preferably, said at least one lifting device comprises a lifting jack. Preferably, said at least one lifting device comprises a hydraulic lifting device.

Preferably, the post-moulding station comprises a first array of lifting devices arranged along a leading edge side of said cradle, and a second array of lifting devices arranged along a trailing edge side of said cradle, wherein said first and second arrays of lifting devices are operable to selectively apply a lifting force to a leading edge side and/or trailing edge side of a blade shell received in said cradle.

DESCRIPTION OF THE INVENTION

Embodiments of the invention will now be described, by way of example only, with reference to the accompanying drawings, in which.

It will be understood that elements common to the different embodiments of the invention have been provided with the same reference numerals in the drawings.

Figure 1:
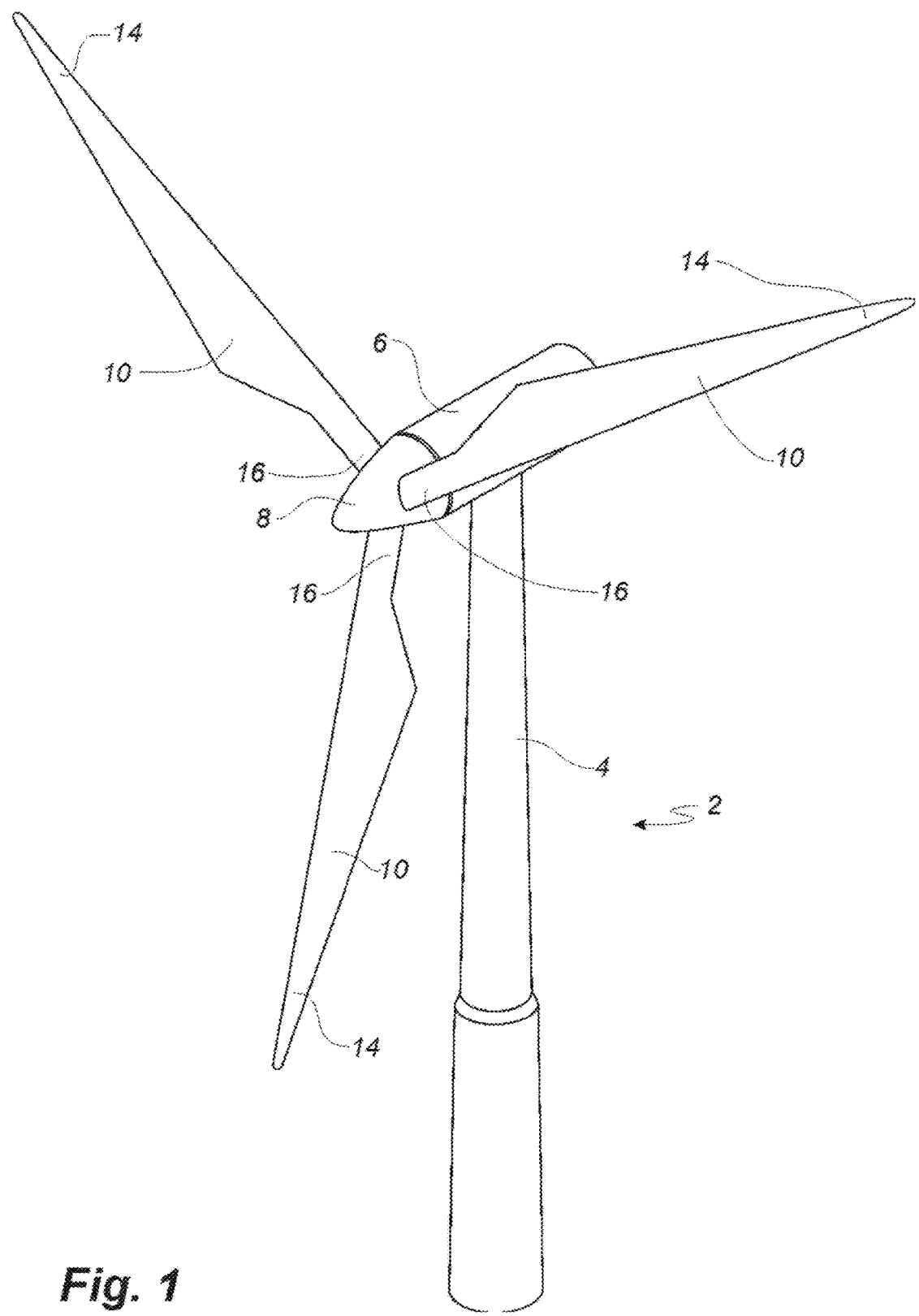
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
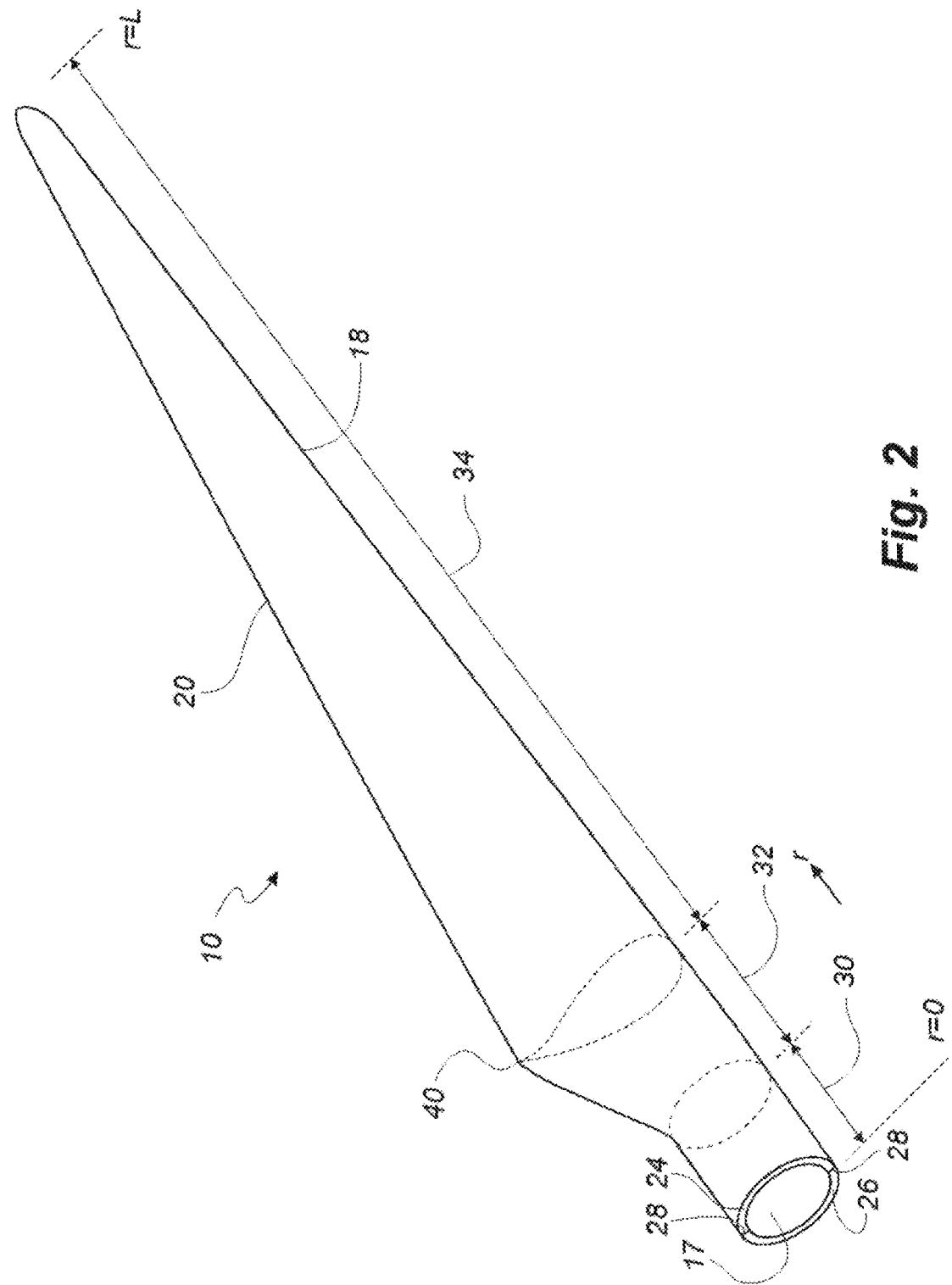
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
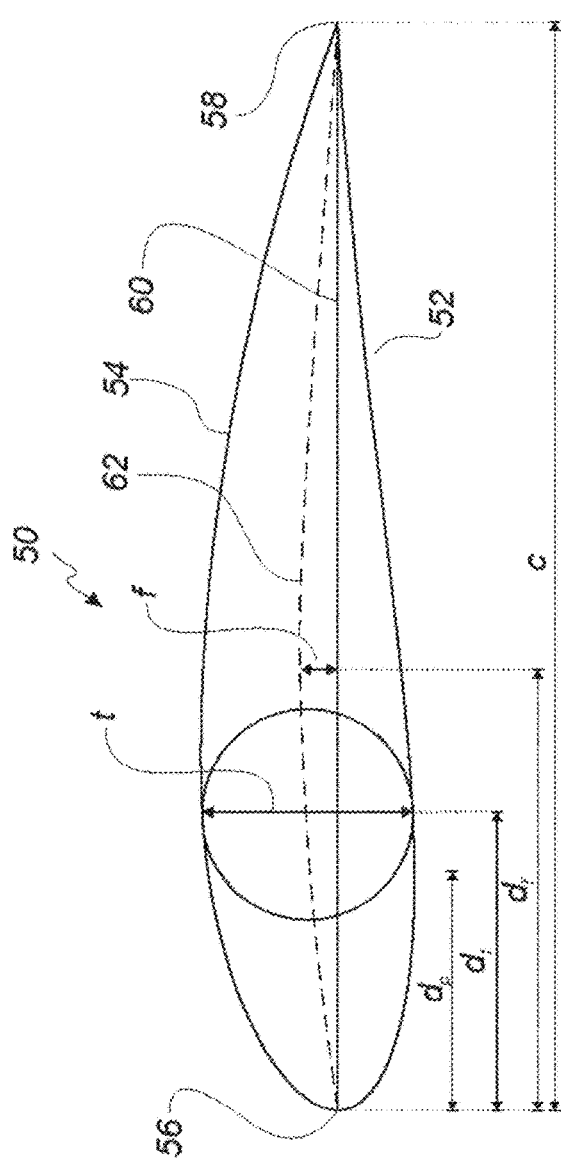
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
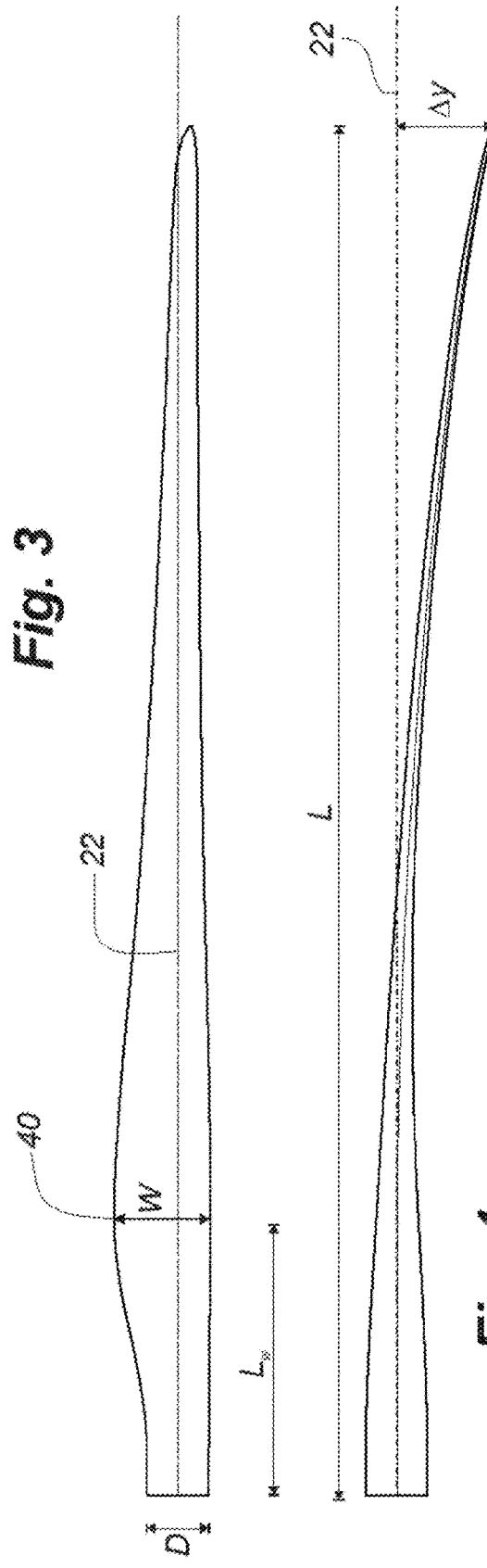
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 meters in length, having blade root diameters of several meters. Wind turbine blades are generally designed for relatively long lifetimes and to withstand considerable structural and dynamic loading.

Figure 5:
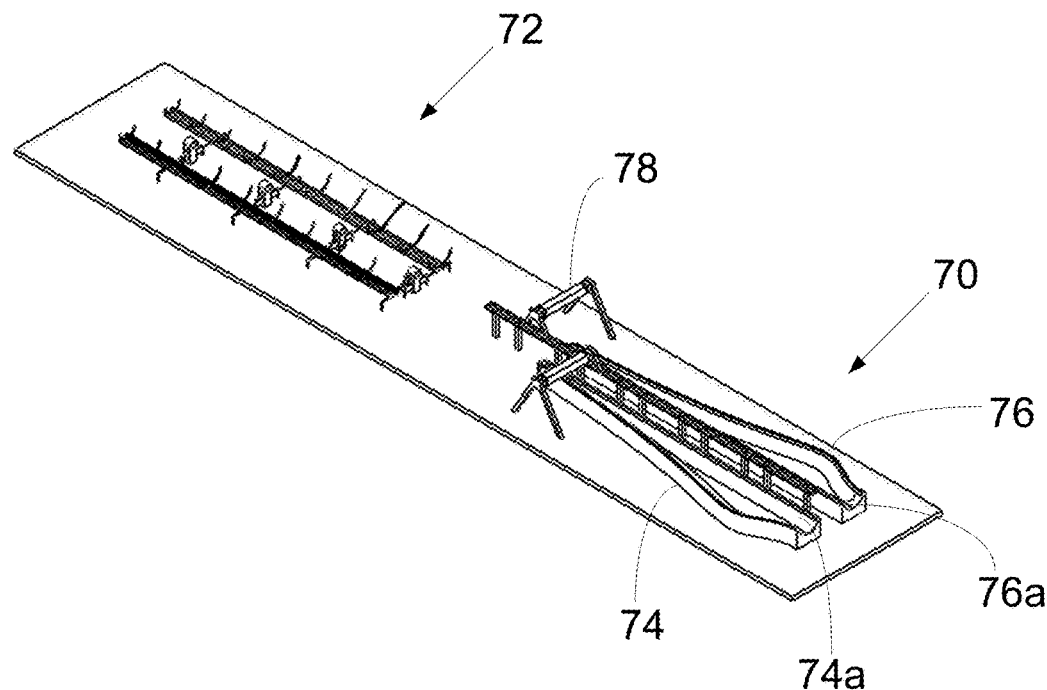
FIG. 5 illustrates an overview of a manufacturing system according to an aspect of the invention.

An overview of a manufacturing system for a wind turbine blade according to the invention is illustrated in FIG. 5. The manufacturing system comprises a blade moulding station (indicated at 70) and a post-moulding station (indicated at 72). The blade moulding station 70 comprises a set of first and second blade shell moulds 74,76. The blade moulds comprise respective first and second internal surfaces 74a,76a which are arranged to produce first and second shaped blade shells having an aerodynamic profile substantially corresponding to respective upwind (or pressure-side) and downwind (or suction-side) halves of a wind turbine blade.

During manufacture of a wind turbine blade, a lay-up operation is performed at the blade moulding station 70, wherein a plurality of layers of a preferably fibre-based composite material are applied to the internal surfaces 74a,76a of the blade moulds 74,76. The fibre layers are applied to conform to the mould shape, and may be arranged at various thicknesses or densities dependent on the structural requirements of the wind turbine blade to be manufactured.

In the embodiment shown in FIG. 5, the blade moulding station 70 is provided with an automatic fibre lay-up apparatus 78, which allows for machine-controlled lay-up of the layers of fibre-based material in the blade moulds 74,76. The automatic fibre lay-up apparatus comprises at least one fibre applicator device suspended on a moveable gantry provided above the blade moulds 74,76, the at least one fibre applicator device operable to move along the length of the blade moulds 74,76 to apply fibre layers, e.g. fibre tape, to the internal surfaces 74a,76a of the blade moulds 74,76.

However, it will be understood that the manufacturing system of the invention may be implemented using any suitable lay-up mechanism, e.g. hand lay-up. Furthermore, the lay-up operation may comprise the use of pultruded elements or pre-pregs of composite material within the blade moulds, either as an alternative to or in addition to the layers of fibre-based material.

Once sufficient layers of the fibre-based material have been applied to the surfaces of the moulds 74,76, a curing operation is then performed to cure the fibre layers to a relatively hardened state. In one embodiment, this may comprise applying a cover or vacuum bag over the fibre layers to form a container, and subsequently applying a vacuum pressure to the interior of the container defined by the vacuum bag and the surface of the blade mould 74,76.

A curing resin is then infused or injected into the interior of the container, the resin spreading throughout the fibre layers by the action of the vacuum pressure. The resin is then allowed to cure and accordingly harden and join the layers of fibre-based material into a blade shell (not shown), having a structural profile corresponding to the shape of the surface of the blade moulds 74,76.

The term "cured blade shells" is used herein to refer to blade shells which have been substantially cured by the curing operation, preferably to a level where the blade shells can be handled without undergoing significant deformation of the shell structure. The duration of the curing operation performed will depend on the type of curing resin used in the manufacture of the blade shells, but may be of the order of 2-3 hours using standard resins. However, it will be understood that the blade shells themselves may continue to undergo a curing process within the body of the blade shells for several hours after the denoted curing operation.

Accordingly, once the blade shells have substantially cured, the associated cover or vacuum bag may be removed, and the cured blade shells can be demoulded from the blade moulds 74,76. To demould the blade shells, any manufacturing equipment which may be provided above the blade moulds 74,76, e.g. automatic fibre applicator device 78, may be removed, and a lifting apparatus (not shown) may be positioned above the blade shells contained in the blade moulds 74,76. The lifting apparatus is operable to lift the cured blade shells out of the blade moulds 74,76, and to transfer the cured blade shells to the post-moulding station 72, where additional post-moulding operations may be performed.

It will be understood that the transferring operation may be performed using any suitable lifting apparatus for the transferal of a wind turbine blade shell, e.g. a vacuum lifting device, a crane, a manual lifting operation, etc.

Examples of post-moulding operations which can be performed at the post-moulding station 72 on the blade shells can include, but are not limited to: a blade shell repair operation, involving a repair of any minor defects in a cured blade shell; a blade shell cutting or grinding operation, wherein a portion of a surface of the cured blade shell can be cut away or ground to present a relatively smooth profile; a blade root flange coupling operation, wherein a pair of blade root flanges which are provided on first and second blade shells are coupled together to form a single integral blade root flange; a gluing operation, wherein an adhesive is applied to a surface of a blade shell to bond components or blade shells together; a coating operation, wherein an external surface of a blade shell is coated with a coating layer, e.g. a gel coat or suitable erosion resistant material; a laminate installation operation, wherein a main laminate or other element of the interior of a wind turbine blade may be fixed to an internal surface of one of the blade shells for positioning in the interior of a wind turbine blade; an overlamination operation; installation of internal blade components, e.g. load or deflection monitoring sensors, lightning protection systems, etc.; a survey of blade shell geometry; a secondary curing operation in, for example, an oven; or any other suitable manufacturing or assembly operations.

Additionally or alternatively, the post-moulding station 72 may comprise first and second blade cradles which are hingedly connected to each other, wherein a first blade cradle can be rotated relative to a second blade cradle, such that respective blade shells held in said first and second cradles can be closed and bonded together to form a wind turbine blade.

As a result of performing these post-moulding operations at the post-moulding station 72, the blade moulds 74,76 are now released from the production time associated with the above post-moulding operations, which traditionally have been performed with the blade shells retained in the blade moulds 74,76. Accordingly, the use of a post-moulding station 72 to receive blade shells from a blade moulding station allows for the blade moulds 74,76 to be freed up for a subsequent lay-up operation once the curing and transferring of the blade shells has been completed, and provides for reduced occupancy time of the blade moulds 74,76 by the components of a single wind turbine blade. This acts to increase the productivity of a single set of blade moulds 74,76, and provides for greater flexibility in the manufacturing process.

In the embodiment of FIG. 5, the post-moulding station 72 comprises an open-ribbed cradle structure to receive a cured blade shell from a blade moulding station, and to support said cured blade shells during post-moulding operations. It will be understood that any suitable open-framed structure may be used, which can be arranged to support a wind turbine blade shell, e.g. an open-framed lattice or truss structure. Preferably, the cradles of the post-moulding station comprise support surfaces arranged to provide cushioned support the blade shells received in the cradles.

Figure 6:
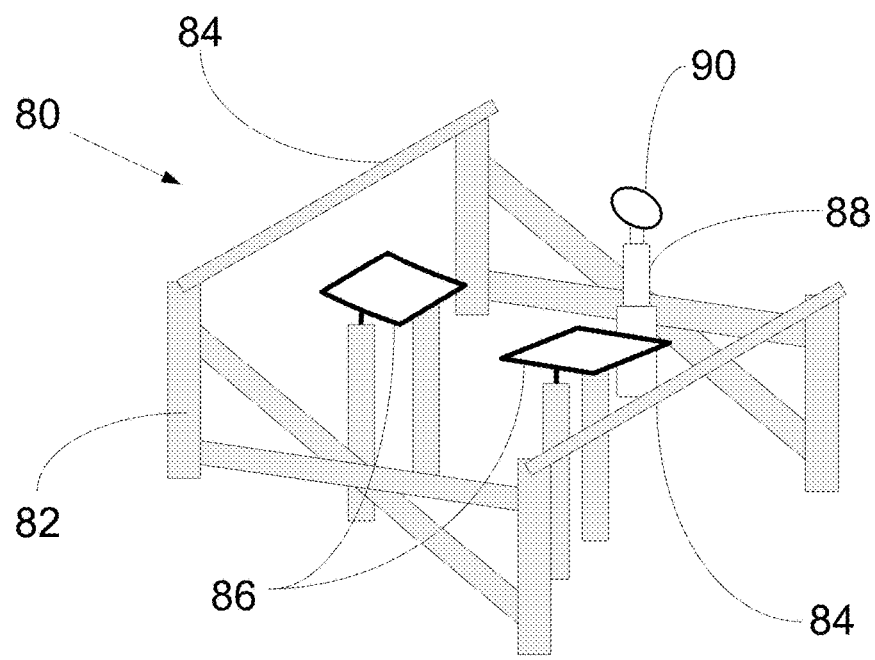
FIG. 6 shows an enlarged view of a section of a blade cradle for use in an embodiment of the system of FIG. 5.

With reference to FIG. 6, an enlarged view of a section of a blade cradle according to an embodiment of the invention is indicated at 80. The cradle 80 comprises an open-frame body 82 allowing partial access to surfaces of a blade shell received within the cradle 80. The cradle 80 further comprises an array of support surfaces, in particular a series of leading- and trailing-edge supports 84 which are arranged to provide support for sections of the respective leading- and trailing-edges of a blade shell received within the cradle 80, and an array of secondary support surfaces 86 which are arranged to support portions of the surface of a blade shell between the leading and trailing edges of the shell. It will be understood that the support surfaces 84,86 and/or portions of the frame body 82 may be adjustable and/or removable from the blade cradle 80.

The cradle 80 further comprises a lifting jack apparatus 88 which is arranged within the frame body 82 of the cradle 80. The lifting jack apparatus 88 comprises a vertical hydraulic lifter having a cushioned surface 90 arranged to act on the surface of a blade shell received within the cradle 80. The lifting jack apparatus 88 is operable to apply a lifting or jacking force to the surface of a blade shell, to at least partially raise the blade shell in the vertical direction. By applying the lifting force to a blade shell, the shell can be partially raised above the surfaces of the frame body 82 of the cradle 80, thereby providing for improved access to the surfaces of the blade shell, e.g. for post-moulding operations on the blade shell surface or for the attachment of blade lifting apparatus, e.g. crane hoists, etc.

It will be understood that the post-moulding station may comprise any number of lifting jack apparatus 88. In one aspect, a single lifting jack apparatus 88 may be moveable relative to the blade cradle 80, such that individual sections of a blade shell or blade received within the cradle 80 can be raised for improved surface access. In an alternative aspect, the post-moulding station may be provided with an array of separate lifting jack apparatus 88 arranged along the length of the cradle 80, wherein the individual lifting jack apparatus 88 can be controlled separately. In such a system, individual lifting jacks may be actuated to provide improved surface access for a section of a blade shell or blade, or each lifting jack may be actuated to raise an entire blade shell or blade at least partially above the cradle 80.

Due to the open-framed structure of the cradle 80, the lifting jack apparatus 88 can be easily positioned at any desired location along the length of a blade shell or finished blade held in the cradle 80, allowing for increased flexibility of access to the surfaces of the blade shell or blade.

Figure 7A:
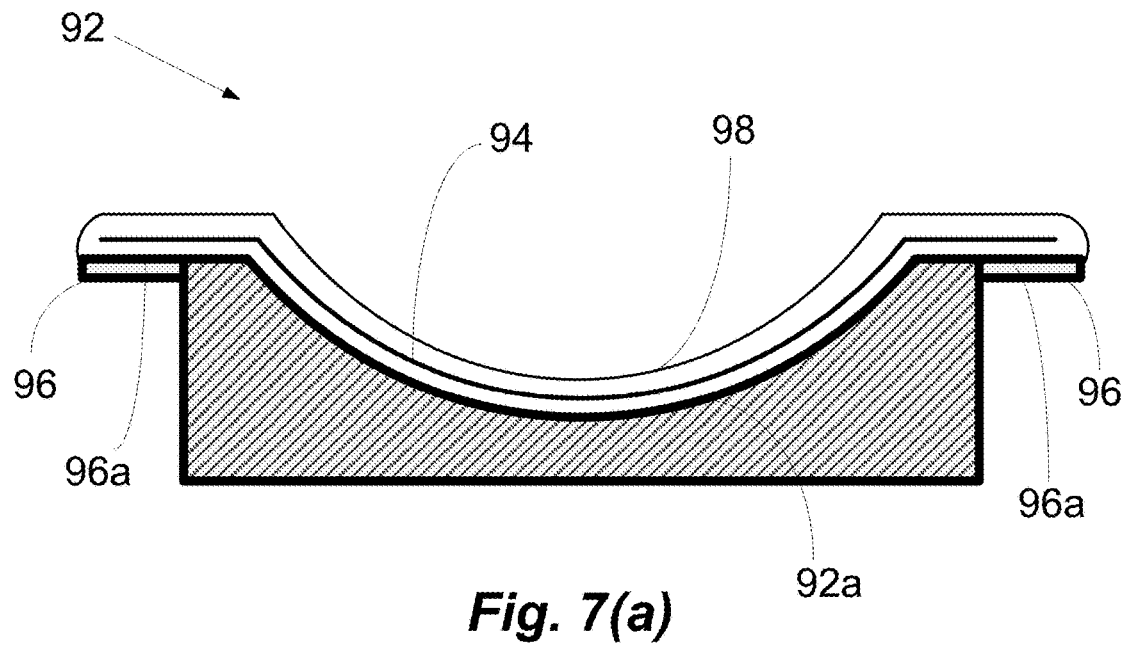
FIG. 7 shows cross-sectional and enlarged views of a section of a blade mould for use in an embodiment of the system of FIG. 5.
Figure 7B:
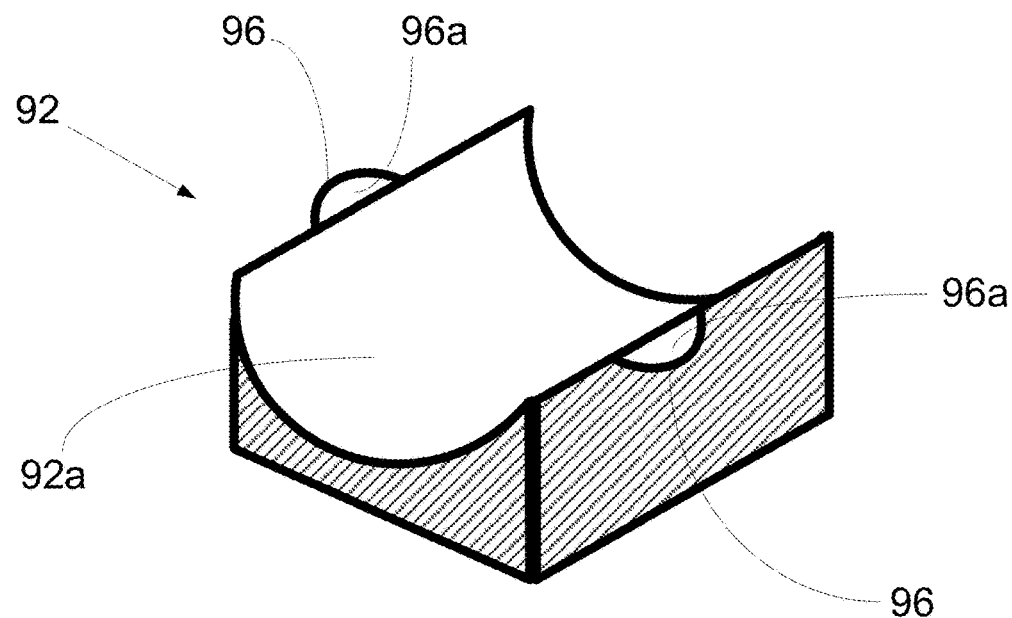

A further aspect of a manufacturing system according to the invention is illustrated in FIGS. 7 and 8. FIGS. 7(a) and 7(b) illustrate cross-sectional and perspective views of a portion of a blade mould 92 for use in the manufacturing system. The mould 92 presents a mould surface 92a which conforms to at least a portion of the surface of a wind turbine blade shell to be formed using the mould 92.

The mould 92 is configured such that a series of additional flange moulding elements 96 are provided on the mould 92, adjacent to the edge of the mould surface 92a. The additional moulding elements 96 present a flange moulding surface 96a for the formation of additional flanges While the embodiment of FIG. 7 shows a pair of additional flange moulding elements 96 located at opposite sides of the mould surface 92a, it will be understood that an array of additional flange moulding elements 96 may be provided along the length of the mould 92, in any suitable configuration.

With reference to FIG. 7(a), a fibre material 94 is applied to the surface 92a of the mould 92, so that the fibre material 94 follows the profile of the mould surface 92a. The fibre material 94 is also applied to the flange moulding surfaces 96a of the additional flange moulding elements 96. Once sufficient fibre material 94 has been applied to the mould 92, a vacuum bag 98 is applied to the edges of the mould 92 including to the edges of the additional flange moulding elements 96, such that a vacuum chamber is substantially formed between the surfaces of the mould 92a,96a and the vacuum bag 98. A resin is then injected or infused into the layers of fibre material 94 and allowed to cure or harden, such that the fibre material 94 forms a wind turbine blade shell having integrated shell flanges.

It will be understood that further materials may be applied in the mould in combination with the fibre material 94 such as structural components, e.g. foam, balsa, as well as components to aid the infusion process, e.g. infusion membranes, resin transfer media. Furthermore, the fibre material applied to the mould may comprise dry fibre layers and/or pre-preg layers. It will be understood that any suitable fibre material may be used, e.g. carbon fibres, glass fibres, etc.

The provision of a blade shell having integrated shell flanges allows for easier handling of the blade shell during the subsequent manufacturing steps. As the flanges are integrally formed with the main body of the blade shell during the moulding process, they provide a strong structural connection to the entire blade shell.

In one aspect, the flanges may be provided with through-going apertures or connectors to allow for the attachment of lifting equipment, for the securing of the blade shells, and/or for the alignment of the blade shells with different components of the manufacturing process. The flanges may be configured to allow for the use of coupling devices such as through bolts, cross bolts, lifting hoists, crane hooks, etc., for the lifting and handling of the blade shells or the finished wind turbine blade.

Preferably, such through-going apertures or connectors are formed by the machining or drilling of the flanges formed by the moulding operation. However, such apertures may also be formed as a part of the moulding operation, e.g. by the use of a suitably shaped insert or shaper positioned on said additional flange moulding elements 96 during the layup process, wherein said insert is subsequently removed from the cured blade shell.

Figure 8A:
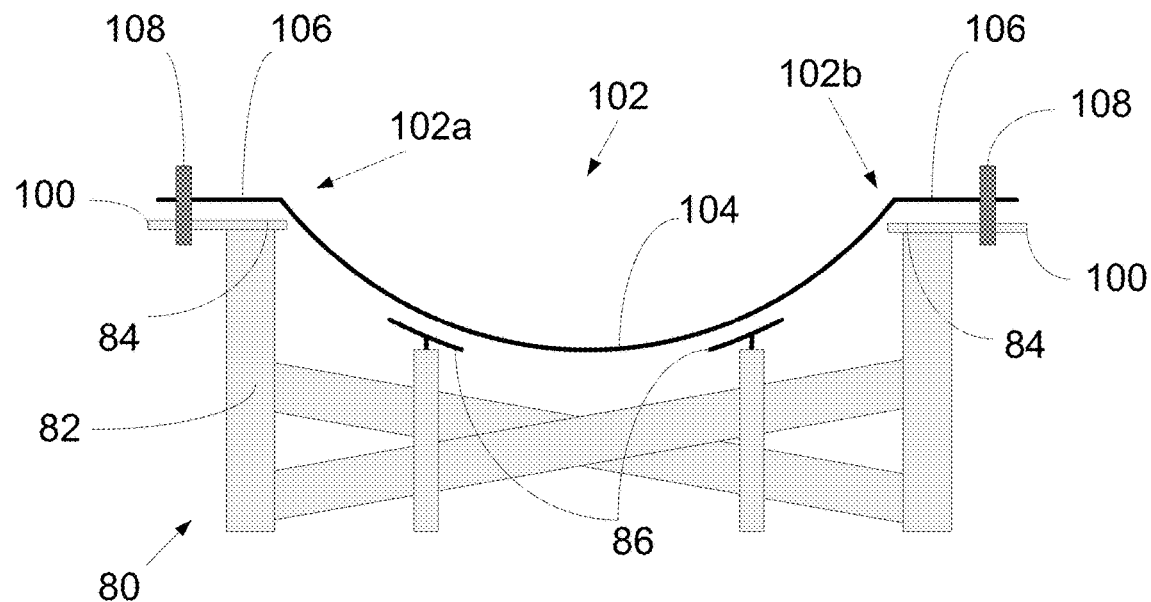
FIG. 8 shows cross-sectional and enlarged views of a section of a blade cradle for use in an embodiment of the system of FIG. 5.
Figure 8B:
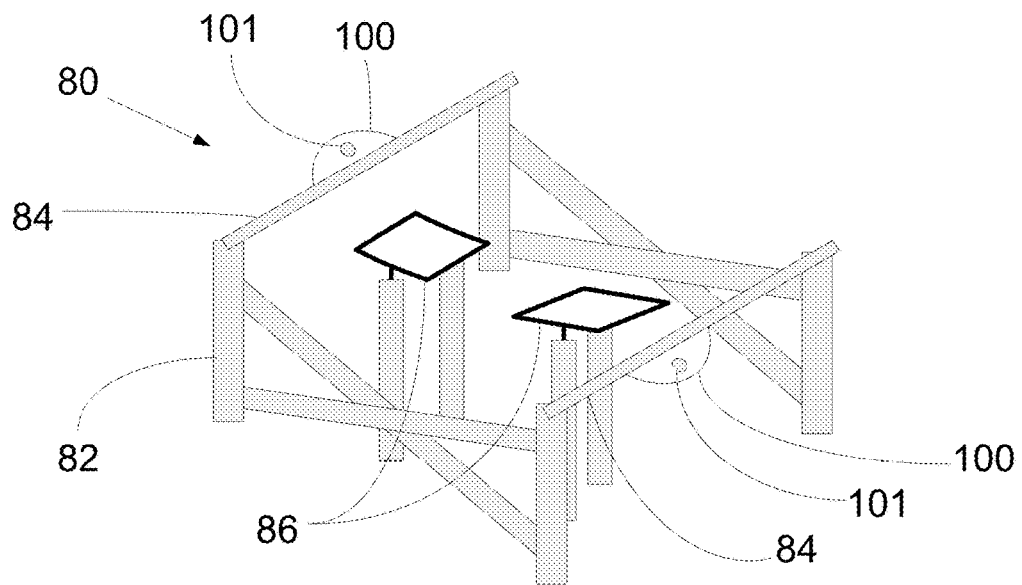

With reference to FIGS. 8(a) and 8(b), cross-sectional and perspective views of a portion of a blade cradle 80 for use in the manufacturing system are illustrated. FIG. 8(b) shows that guide flanges 100 are defined on the blade cradle 80, preferably at locations along the leading- and trailing-edge supports 84 of the cradle 80. The guide flanges 100 allow for accurate alignment between the blade cradle 80 and a blade shell to be received within the cradle 80, as the guide flanges 100 provide for markers which can be co-located with the integrated flanges of the blade shell. The guide flanges 100 may be provided with suitable apertures, channels, or visual markers 101 to aid in the alignment and/or attachment of the blade shell flanges to the cradle 80.

It will be understood that suitable guide rods (not shown) may be defined on or project from the blade shell flanges for engagement with corresponding apertures or channels defined on the guide flanges 100 of the blade cradle 80, and/or guide rods may be defined on or project from the guide flanges 100 of the blade cradle 80 for engagement with corresponding apertures or channels defined on the blade shell flanges. Additionally or alternatively, a visual alignment may be performed between the shell flanges and the cradle flanges 100.

With reference to FIG. 8(a), a cross-sectional view of a blade cradle 80 is shown having a blade shell 102 received within the cradle 80. The blade shell 102 comprises shell edges 102a,102b which are supported by the leading- and trailing-edge supports 84 of the cradle, and a midboard portion 104 which is supported by the secondary support surfaces 86 of the cradle 80. In addition, the blade shell 102 comprises a plurality of blade shell flanges 106 which are arranged along the edges of the blade shell 102, where said blade shell flanges 106 are received on the guide flanges 100 of the cradle 80. In the embodiment shown in FIG. 8(a), the blade shell flanges 106 are coupled to the guide flanges 100 blade cradle 80 using through-going bolts 108, preferably lockable bolts. Additionally or alternatively, the blade shell flanges 106 may be coupled to the guide flanges 100 of the cradle 80 using a clamping device (not shown). The use of such bolts prevents movement of the blade shell 102 when held in the cradle 80, for example during a post-moulding operation, or during a blade shell turning operation.

When the handling or processing of the blade shell 102 is largely complete, the integrated flanges 106 are preferably removed from the blade shell 102, e.g. by cutting or machining of the flanges 106. The location of the flanges may then be smoothed or polished to provide a smooth surface for the exterior of the blade.

The provision of the integrated flanges for the blade shells, and/or the lifting jack apparatus for the blade cradles, provides for increased flexibility of blade shell handling and processing, as part of the manufacturing process.

The invention is not limited to the embodiments described herein, and may be modified or adapted without departing from the scope of the present invention.

The invention claimed is:

1. A wind turbine blade manufacturing apparatus comprising:
    a wind turbine blade mould (92) for forming a blade shell (102); and
    a blade cradle (80) for receiving a blade shell (102) formed in said mould (92),
    wherein said blade mould (92) is arranged to form a blade shell (102) having at least one integrated flange (106) used for subsequent handling of said blade shell (102), and wherein the blade cradle (80) comprises markers for aligning with said at least one integrated flange (106).

2. The apparatus of claim 1, wherein said blade cradle (80) comprises at least one guide rod for aligning said blade cradle (80) with at least one integrated flange (106) provided on a blade shell (100) formed in said blade mould.

3. A method for manufacturing a wind turbine blade (10) comprising the steps of:
    moulding at least one wind turbine blade shell (102) in a blade mould (92); and
    transferring said blade shell (102) to a blade cradle (80) for post-moulding operations,
    wherein said step of moulding comprises forming integrated flanges (106) as part of said blade shell (102), and wherein said flanges (106) are used for subsequent handling of said blade shell, said flanges (106) comprising guide flanges, and
    wherein said step of transferring said blade shell (102) to the blade cradle (80) comprises aligning the guide flanges (106) with corresponding markers (100) provided on said blade cradle (80).

4. The method of claim 3, wherein said guide flanges (106) comprise guide holes, wherein corresponding guide rods are provided on said blade cradle (80), and wherein said step of aligning comprises positioning said blade shell (102) in said blade cradle (80) such that said guide rods are received in said guide holes.

5. The method of claim 3, wherein said flanges comprise bolting flanges having bolt apertures defined thereon, and wherein the method comprises the step of releasably securing said blade shell to said mould and/or to said blade cradle by bolting said bolting flanges to said mould and/or to said blade cradle.

6. The method of claim 3, wherein the method comprises the steps of:
    transferring a first blade shell to a first blade cradle;
    transferring a second blade shell to a second blade cradle; and
    closing first and second blade cradles to join said first and second blade shells to form at least a portion of a wind turbine blade.

7. The method of claim 6, wherein said step of closing comprises aligning said first blade shell and said second blade shell, wherein at least one flange provided on said first blade shell is used to align with at least one flange provided on said second blade shell.

8. The method of claim 6, wherein said step of closing comprises bonding said first blade shell to said second blade shell to form at least a portion of a wind turbine blade.

9. The method of claim 3, wherein the step of forming integrated flanges comprises:
    forming a first array of flanges along a leading edge side of said blade shell; and
    forming a second array of flanges along a trailing edge side of said blade shell.

10. The method of claim 3, wherein the method further comprises the step of removing said flanges from said wind turbine blade shell after said step of transferring, preferably after said step of closing said first and second cradles.

11. The method of claim 3, wherein the step of moulding comprises:
    providing a blade mould having a primary mould surface to define a surface of a wind turbine blade shell;
    applying fibre material on said primary mould surface;
    providing a resin; and
    curing said resin in said fibre material to provide a blade shell.

12. The method of claim 3, wherein the method comprises the step of applying a lifting force to a surface of a blade shell received in said cradle from beneath said blade shell to raise at least a portion of said blade shell above said cradle, to allow a post-moulding operation to be performed on a surface of said blade shell.

\* \* \* \* \*